US006779109B2

(12) United States Patent
Stevens

(10) Patent No.: US 6,779,109 B2
(45) Date of Patent: Aug. 17, 2004

(54) SYSTEMS, SOFTWARE AND METHODS FOR ALLOCATING ADDITIONAL MASS STORAGE MEDIA SPACE FROM FREE MEDIA SPACE AVAILABLE IN THE HOST PROTECTED AREA

(75) Inventor: Curtis E. Stevens, Irvine, CA (US)

(73) Assignee: Phoenix Technologies Ltd., Milpitas, CA (US)

( * ) Notice: Subject to any disclaimer, the term of this patent is extended or adjusted under 35 U.S.C. 154(b) by 21 days.

(21) Appl. No.: 10/200,907

(22) Filed: Jul. 23, 2002

(65) Prior Publication Data

US 2004/0019739 A1 Jan. 29, 2004

(51) Int. Cl.[7] ................................................ G06F 9/24
(52) U.S. Cl. ......................................................... 713/1
(58) Field of Search ............................... 713/1; 711/173

(56) References Cited

U.S. PATENT DOCUMENTS 5,706,472 A * 1/1998 Ruff et al. .................. 711/173
5,897,661 A * 4/1999 Baranovsky et al. ........ 711/170
2002/0129217 A1 * 9/2002 Nichols ...................... 711/173

FOREIGN PATENT DOCUMENTS

JP            09128276 A   *  5/1997   ........... G06F/12/00

OTHER PUBLICATIONS

Stevens, Curtis E. "Information Technology—Protected Area Run Time Interface Extension Services (T13 D1367)". 1999. American National Standards Institute.*

* cited by examiner

Primary Examiner—Thomas Lee
Assistant Examiner—Eric Chang

(57) ABSTRACT

Reservation and allocation of additional space on a hard disk drive for use by an end user is disclosed. A user-accessible area of a hard disk drive is enlarged by determining if a boot engineering extension record is present. If the boot engineering extension record is present, the amount of free media space in the host protected area of the hard disk drive is determined. If media space is available, the unused portion of the host protected area is converted to be user-accessible.

10 Claims, 3 Drawing Sheets

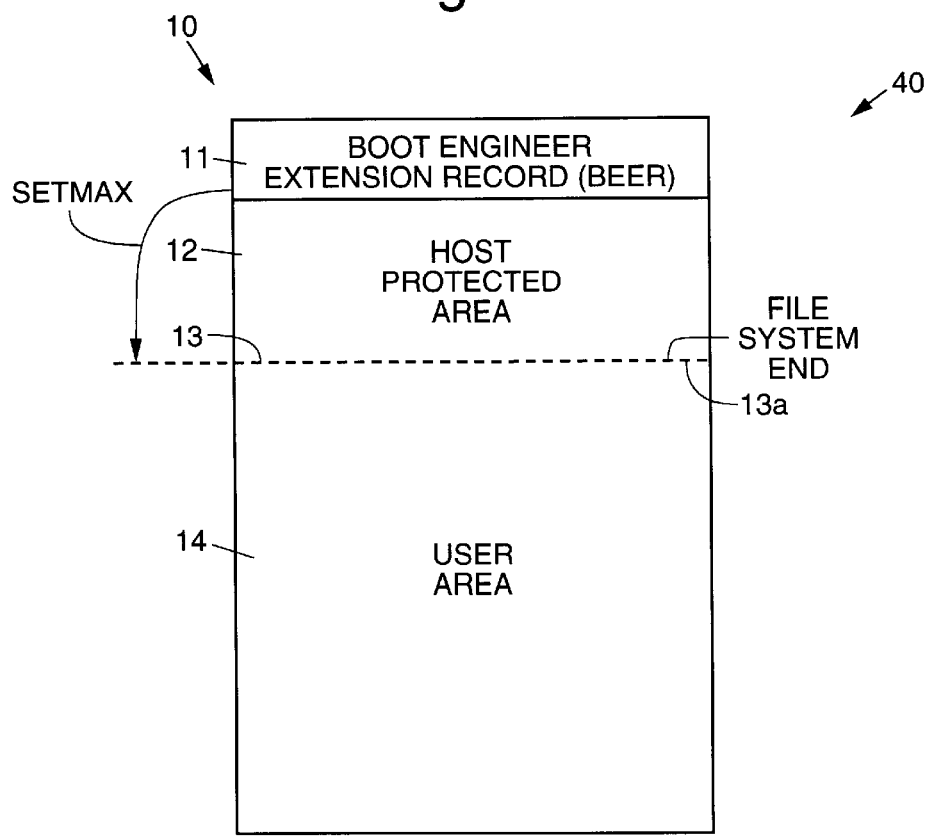

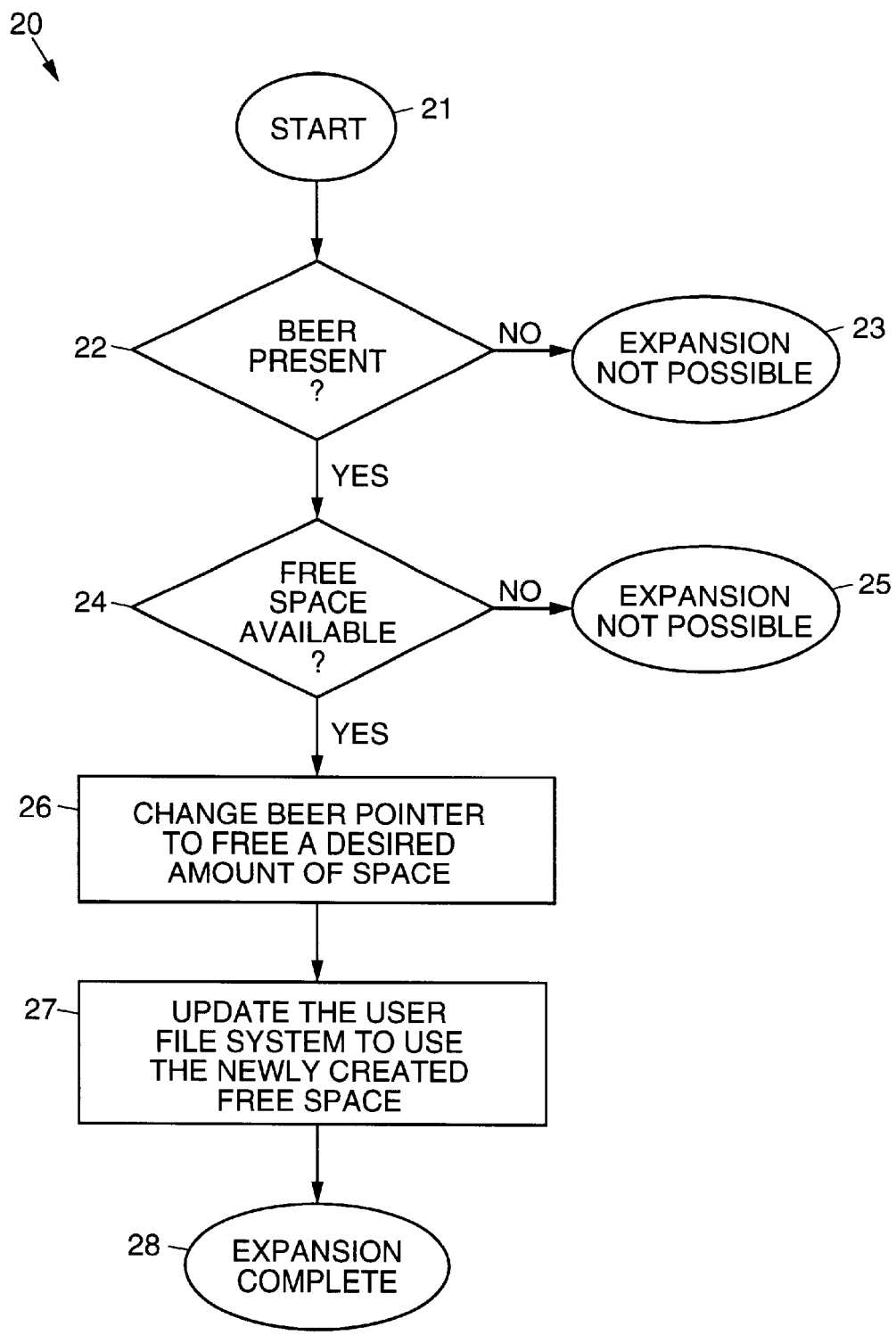

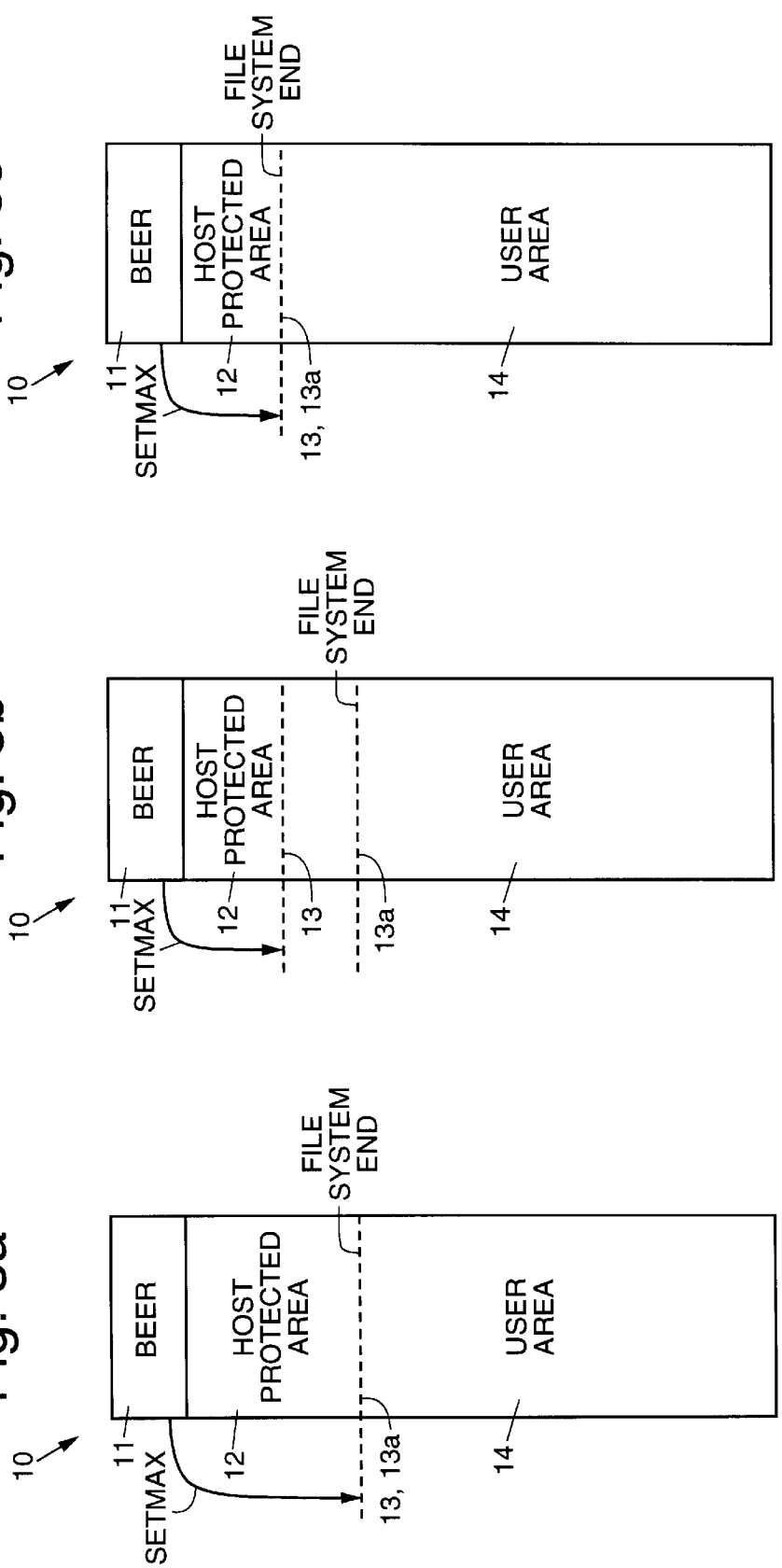

SYSTEMS, SOFTWARE AND METHODS FOR ALLOCATING ADDITIONAL MASS STORAGE MEDIA SPACE FROM FREE MEDIA SPACE AVAILABLE IN THE HOST PROTECTED AREA

BACKGROUND

The present invention relates generally to computer systems, software and methods, and more particularly, to computer systems, software and methods that allow a computer system integrator to reserve a predetermined amount of space on a hard drive and then enable that space for use by an end user after the computer system is in the hands of the end user.

Many currently-available hard disk drives have the ability to be resized by a system integrator. The PARTIES (Protected Are: Run-Time Interface Extension Services) specification, for example, provides methods for reserving space on a hard drive, and emulating a floppy drive.

Although a hard disk drive can be made smaller, making the drive larger again can be an issue. Generally, disk drive vendor and product specific tools must be used to change the size of the drive. This can be a problem since disk drive manufacturers do not generally want end users to have access to their drive modification tools. Although there are now some generic ways to change the size of the drive, no infrastructure exists to allow the changes to be made, particularly by an end user. In addition, the PARTIES specification does not provide a method for reallocating hard disk drive space to the computer user.

Most currently-available hard disk drives are manufactured with 20, 40 or 60 gigabytes of drive space (defined by one, two or three disk platters). Many times, because of cost considerations, a personal computer manufacturer will install 60 gigabyte hard disk drives in all of the personal computer systems that they sell, even though some of the systems are configured to have 20 or 40 gigabyte hard disk drives.

After delivery of the computer system to the end user, the number one technical support issue (for computers with Intel® microprocessors) relates to installation of a larger hard disk drive. It would be desirable to have the ability for an end user to enlarge the available hard disk drive space, if such space is available (i.e., a 60 gigabyte drive is installed but is configured to have only 20 or 40 gigabytes of space available to the user.

It is an objective of the present invention to provide for computer systems, software and methods that allow a computer system integrator to reserve a predetermined amount of space on a hard disk drive and then enable the space for use an end user after the computer system is in the hands of the end user.

SUMMARY OF THE INVENTION

To accomplish the above and other objectives, the present invention provides for computer systems, software and methods that allows a computer system integrator to reserve a predetermined amount of space on a hard disk drive and then enable that space for use by an end user after the system is in the hands of the end user. More specifically, the present method provides for computer systems, software and methods that permit changing the size of the user area of a hard disk drive after a computer system is in the hands of a user.

The computer software and methods are embodied in a computer system having an operating system and a hard disk drive. The hard disk drive is configured, in accordance with a PARTIES specification, for example, to have a boot engineering extension record (BEER) that comprises a BEER pointer that points to a SETMAX marker and an end of file system marker that together define a host protected area and indicate an end of a user-accessible area of the hard disk drive. The computer software and methods embodied in the computer system are operative to enlarge the user-accessible area of the hard disk drive.

An exemplary embodiment of a computer system in accordance with the present invention comprises an operating system and a hard disk drive that is configured (in accordance with a PARTIES specification, for example) to have a boot engineering extension record (BEER) that comprises a BEER pointer that points to a SETMAX marker that defines a host protected area and indicate an end of a user-accessible area of the hard disk drive. Software is provided that, once enabled (by the personal computer manufacturer, for example), and assuming that additional end user space is available on the hard disk drive, is operative to allow the end user to increase the usable area of the hard disk drive.

An exemplary embodiment that implements the present method comprises the following steps. It is determined if the boot engineering extension record is present on the hard disk drive. If the boot engineering extension record is present, it is determined if free media space is available on the hard disk drive. If free media space is available on the hard disk drive, the BEER pointer is changed to move the SETMAX marker and allocate additional media space on the hard disk drive for use as part of the user accessible area. The end of file system marker is moved to match the moved SETMAX marker to set the enlarged user-accessible area of the hard disk drive.

An exemplary embodiment of computer software in accordance with the present invention comprises a code segment that determines if a boot engineering extension record is present on the hard disk drive. A code segment determines if free media space is available on the hard disk drive once it is determined that the boot engineering extension record is present. A code segment changes the BEER pointer if free media space is available to move the SETMAX marker to allocate additional media space from the host protected area on the hard disk drive for use as part of the user accessible area. A code segment moves the end of file system marker to match the moved SETMAX marker to set the enlarged user-accessible area of the hard disk drive.

BRIEF DESCRIPTION OF THE DRAWINGS

The various features and advantages of the present invention may be more readily understood with reference to the following detailed description taken in conjunction with the accompanying drawing, wherein like reference numerals designate like structural elements, and in which:

FIG. 1 illustrates an exemplary computer system in accordance with the principles of the present invention employing an exemplary hard disk drive that is formatted using the PARTIES specification;

FIG. 2 is a flow diagram that illustrates an exemplary embodiment of a method in accordance with the principles of the present invention; and FIGS. 3a–3c illustrate how the hard disk drive is reconfigured using the exemplary method illustrated in FIG. 2.

DETAILED DESCRIPTION

Referring to the drawing figures, FIG. 1 illustrates a typical hard disk drive 10 of a computer system 40 that is formatted using the PARTIES (Protected Area Run-Time Interface Extensions Services) specification, for example. Formatting the hard disk drive 10 using the PARTIES specification allows the system 40 to reserve space on the hard disk drive 10 for use by the system 40. This space is divided into service areas via a Boot Engineering Extension Record (BEER) 11. The individual service areas may be used for data storage or booting a fail-safe operating system, for example.

The hard disk drive 10 is formatted such that there is a host protected area 12 that is separated from a user accessible area 14 using a SETMAX command. The SETMAX command typically generates a SETMAX marker 13 (fence) and end of file system marker 13*a* on the hard disk drive 10 beyond which the user cannot access. Thus, the end user only has access to hard disk drive space or media space below the SETMAX marker 13.

More particularly, the boot engineering extension record (BEER) comprises a BEER pointer that points to the SETMAX marker 13 that defines a boundary between the host protected area 12 and the user-accessible area 14 of the hard disk drive 10. The SETMAX marker 13 and the end of file system marker 13*a* together indicates an upper end of the user-accessible area 14.

The present invention enables a portion of the host protected area 12 to be released to the operating system that may be configured for use by the user. This is accomplished in the following manner, with reference to FIG. 2. FIG. 2 is a flow diagram that illustrates an exemplary embodiment of a method 20 in accordance with the principles of the present invention.

The exemplary method 20 comprises the following steps. The method 20 starts 21 and a determination 22 is made if a boot engineering extension record (BEER) 11 is present on the hard disk drive 10. If the boot engineering extension record 11 is not present (NO), then expansion is not possible 23. If the boot engineering extension record 11 is present (YES) on the hard disk drive 10, then a determination 24 is made if free hard disk drive space is available. The free media space is a portion of the host protected area 12. If there is no available free hard disk drive space (NO), then expansion is not possible 25.

If there is available free hard disk drive space (YES), then the BEER pointer is changed 26 to free up a desired amount of hard disk drive media space for use by the operating system. The BEER pointer is changed 26 to move the SETMAX marker 13 to allocate additional media space from the host protected area 12 on the hard disk drive 10 for use as part of the user accessible area 14.

Then the user file system of the operating system is updated 27 (i.e., the end of file system marker 13*a* is moved) so that the operating system has access to the newly allocated free space. In particular, the end of file system marker 13*a* is moved to match the moved SETMAX marker 13 to set the enlarged user-accessible area 14 of the hard disk drive 10.

The steps described with reference to FIG. 2 cause the sequence of events to happen that are shown in FIGS. 3*a*–3*c*. FIGS. 3*a*–3*b* illustrate how the hard disk drive 10 is reconfigured using the exemplary method 20 illustrated in FIG. 2.

As is shown in FIG. 3*a*, the PARTIES configured hard disk drive 10 has the BEER sector 11, the host protected area 12, and the user area 14 separated from the host protected area 12 by the SETMAX marker 13. As is shown in FIG. 3*b*, when steps 21–26 shown in FIG. 2 are implemented, the SETMAX marker 13 is moved to enlarge the size of the user area 14. Then, and as is shown in FIG. 3*c*, when step 27 is implemented, the file system end marker 13*a* is set to match the new SETMAX marker 13 so that the operating system has access to the expanded user area 14.

One advantage of the present invention over the prior art is that the present invention allows a user or owner of a computer system 40 to expand the useable hard disk drive space without removing the hard disk drive 10 from the computer system 40. A software tool implementing the method 20 described with reference to FIG. 2 can be used by a computer user to expand the file system to allocate the newly added hard disk drive space. Thus, the present invention allows the owner or user of the computer system 40 to enlarge the useable area of a hard disk drive 10 without removing the hard disk drive 10 from the computer system 40.

The present invention also embodies computer software that implements the above-described method 20. The computer software comprises the following code segments. A code segment is provided that determines if a boot engineering extension record 11 is present on a hard disk drive 10. A code segment is provided that determines if free media space is available on the hard disk drive 10 (typically part of the host protected area) if the boot engineering extension record is present. A code segment is provided that changes the BEER pointer to move the SETMAX marker 13 to allocate additional media space from the host protected area on the hard disk drive 10 for use as part of the user accessible area if free media space is available. A code segment is provided that moves the end of file system marker 13*a* to match the moved SETMAX marker 13 to set the enlarged user-accessible area of the hard disk drive 10.

Using the present invention, a personal computer manufacturer may employ 60 gigabyte hard disk drives 10, for example, in all of the personal computers systems 40 that are sold, and allow the end user to increase the size of the drive 10 after delivery. The present invention enables the end user to telephone or otherwise contact a technical support technician who can instruct and enable the user to enlarge, if possible, the user-accessible space of the hard disk drive 10 using the present invention.

One mechanism to achieve this is to provide a utility on the personal computer system 40 that can enlarge the user-accessible space of the hard disk drive 10. If a support technician is contacted regarding a larger hard disk drive or additional hard disk drive space, the end user is asked to run the utility. The utility displays a machine identification number (serial number of the computer system 40, for example). The support technician uses the identification number to determine the size of the user-accessible space on the hard disk drive 10. If space is available, the support technician can sell the user additional user-accessible space.

One way to do this is for the support technician to provide the user with an unlock key for use with the utility that is dependent upon the configuration of the personal computer system 40 and includes the amount of additional user-accessible disk drive space that is sold. The end user then enters the unlock key into the utility. The utility then releases the requested additional user-accessible space on the hard disk drive 10 to the end user and expands the file system of the computer system 40 so that the enlarged hard disk drive space is available. The utility includes software code that changes the BEER pointer to move the SETMAX marker 13 to allocate additional hard disk drive space from the host protected area on the hard disk drive 10 for use as user accessible area.

Thus, computer systems, software and methods that allow reservation of a predetermined amount of space on a hard drive and enablement of that space for use an end user after the computer system is in the hands of the end user have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A method for use with a computer system having an operating system and a hard disk drive, wherein the hard disk drive is configured to have a boot engineering extension record (BEER) that comprises a BEER pointer that points to a SETMAX marker that defines a host protected area and indicate an end of a user-accessible area of the hard disk drive, for enlarging the user-accessible area of the hard disk drive, the method comprising the steps of:

determining if the boot engineering extension record is present on the hard disk drive;

if the boot engineering extension record is present, determining if free media space is available in the host protected area of the hard disk drive;

if free media space is available in the host protected area of the hard disk drive, changing the BEER pointer to move the SETMAX marker and allocate additional media space on the hard disk drive for use as part of the user-accessible area; and moving the end of file system marker to match the moved SETMAX marker to set the enlarged user-accessible area of the hard disk drive.

2. The method recited in claim 1 wherein the hard disk drive is configured in accordance with a PARTIES (Protected Area Run-Time Interface Extensions Services) specification.

3. The method recited in claim 1 further comprising the steps of unlocking the hard disk drive to permit movement of the SETMAX marker to allocate the additional media space on the hard disk drive.

4. A computer system comprising:

an operating system;

a hard disk drive configured to have a boot engineering extension record (BEER) including a BEER pointer that points to a marker that defines a location of a host protected area of the hard disk drive; and software for enlarging a user-accessible area of the hard disk drive comprising:

a code segment that determines if a BEER is present on the hard disk drive;

a code segment that determines if additional media space is available in the host protected area on the hard disk drive once it is determined that the BEER is present;

a code segment that changes the BEER pointer if free media space is available in the host protected area to move the marker to allocate additional space on the hard disk drive for use as part of the user-accessible area; and a code segment that moves the end of file system marker to match the moved marker to set the enlarged user-accessible area of the hard disk drive.

5. The computer system recited in claim 4 wherein the code segment that determines if free media space is available on the hard disk drive further determines if free media space is available in the host protected area of the hard disk drive.

6. The computer system recited in claim 4 wherein the hard disk drive is configured in accordance with a Protected Area Run-Time Interface Extensions Services specification.

7. The computer system recited in claim 4 wherein the software further comprises a code segment that unlocks the hard disk drive to permit movement of the marker to allocate the additional media space on the hard disk drive.

8. A computer program product stored in a computer readable medium for enlarging the user-accessible area of a hard disk drive, comprising:

means for determining if a boot engineering extension record is present on the hard disk drive;

means for determining if free media space is available in the host protected area of the hard disk drive once it is determined that the boot engineering extension record is present;

means for changing a boot engineering extension record pointer if free media space is available to move a host protected area marker to allocate additional media space on the hard disk drive for use as part of the user-accessible area; and means for moving an end of file system marker to match the moved host protected area marker to set the enlarged user-accessible area of the hard disk drive.

9. The computer program product of claim 8 wherein the hard disk drive is configured in accordance with the Protected Area Run-Time Interface Extensions Services specification.

10. The computer program product of claim 8, further including means for unlocking the hard disk drive to permit movement of the host protected area marker to allocate the additional media space on the hard disk drive.

* * * * *